US012564996B2

(12) United States Patent
Liu

(10) Patent No.: US 12,564,996 B2
(45) Date of Patent: Mar. 3, 2026

(54) INTEGRATED FILM APPLICATION DEVICE

(71) Applicant: WTL Technology Shenzhen CO., LTD., Shenzhen (CN)

(72) Inventor: Tak Nam Liu, Shenzhen (CN)

(73) Assignee: WTL Technology Shenzhen CO., LTD., Shenzhen (CN)

( * ) Notice: Subject to any disclaimer, the term of this patent is extended or adjusted under 35 U.S.C. 154(b) by 293 days.

(21) Appl. No.: 18/213,268

(22) Filed: Jun. 23, 2023

(65) Prior Publication Data

US 2024/0424727 A1 Dec. 26, 2024

(51) Int. Cl.
*B29C 63/00* (2006.01)
*B29C 63/02* (2006.01)

(52) U.S. Cl.
CPC ...... *B29C 63/0004* (2013.01); *B29C 63/0047* (2013.01); *B29C 63/02* (2013.01); *B29C 2063/0008* (2013.01)

(58) Field of Classification Search
None
See application file for complete search history.

(56) References Cited

U.S. PATENT DOCUMENTS

2003/0226637 A1* 12/2003 David ..................... C04B 41/61
156/286
2016/0082710 A1* 3/2016 Coxon .................... B29C 70/44
156/60
2021/0354337 A1* 11/2021 Whiting ................ B29C 66/634

FOREIGN PATENT DOCUMENTS

CN    219215543 U  *  6/2023

OTHER PUBLICATIONS

CN219215543U_machine_translation (Year: 2023).*

* cited by examiner

*Primary Examiner* — Michael N Orlando
*Assistant Examiner* — Abhishek A Patwardhan
(74) *Attorney, Agent, or Firm* — Jose Cherson Weissbrot

(57) ABSTRACT

An integrated film application device comprises a bottom shell, wherein back side of the bottom shell is hinged with a surface shell, both sides of top end of the surface shell have displacement ports, inner walls of the two displacement ports are connected with sliding rods in a sliding manner, top ends of the two sliding rods are fixedly connected with push handles, bottoms of the two sliding rods are rotatably connected with rollers, an inner wall of the bottom shell is fixedly connected with a bottom box, a middle part of a top end of the bottom box has a mobile phone groove, both ends of both sides of the top end of the bottom box are fixedly connected with positioning columns, both sides of one end of the top end of the bottom box are fixedly connected with clamping seats.

7 Claims, 3 Drawing Sheets

INTEGRATED FILM APPLICATION DEVICE

TECHNICAL FIELD

The present application belongs to the field of film application device, and in particular relates to an integrated film application device.

BACKGROUND

The mobile phone film application device aims to more accurately align and stick a mobile phone film on a mobile phone screen.

However, the existing mobile phone film application device has the following disadvantages:

(1) The existing mobile phone film application device is inconvenient to operate, and cannot quickly align and stick the mobile phone film to the mobile phone screen, so the efficiency is low;

(2) The existing mobile phone film application device lacks a flattening structure for air bubbles on the film after sticking the film, which is not convenient enough.

SUMMARY

The application aims to provide an integrated film application device, so as to solve the problems of the related mobile phone film application device proposed in the background that the operation is inconvenient, the mobile phone film and the mobile phone screen cannot be quickly aligned and sticked, the efficiency is low, and the mobile phone film application device lacks a structure for flattening air bubbles on the film after sticking the film, so that the mobile phone film application device is not convenient enough.

In order to achieve the above purpose, the application provides the following technical scheme: An integrated film application device comprises a bottom shell, wherein back side of the bottom shell is hinged with a surface shell, both sides of top end of the surface shell have displacement ports, inner walls of the two displacement ports are connected with sliding rods in a sliding manner, top ends of the two sliding rods are fixedly connected with push handles, bottoms of the two sliding rods are rotatably connected with rollers, an inner wall of the bottom shell is fixedly connected with a bottom box, a middle part of a top end of the bottom box has a mobile phone groove, both ends of both sides of the top end of the bottom box are fixedly connected with positioning columns, both sides of one end of the top end of the bottom box are fixedly connected with clamping seats, an inner wall of the surface shell is fixedly connected with a top cap, both ends of both sides of a bottom end of the top cap has positioning grooves, the two side of one end of the bottom end of the top cap are fixedly connected with clamping blocks.

When using the integrated film application device provided by the technical scheme, the process of film sticking on the screen of the mobile phone is more rapid and accurate, and the efficiency is high. The roller can press the adhered toughened film, so that the sticking is tighter, and bubbles are removed.

As a preferred technical solution of the application, the top of the two sliding rods is fixedly connected with a limiting plate. The setting of the limiting plate can prevent the push handle from moving up and down.

As a preferred technical solution of the application, both sides of the inner wall of the mobile phone groove are provided with a take out groove. The setting of the shifting groove is convenient for taking out the clamped mobile phone.

As a preferred technical solution of the application, the front side of the surface shell is provided with a drawing opening. The drawing opening is used for drawing out the release film.

As a preferred technical solution of the application, two ends of both sides of the bottom end of the bottom shell are fixedly connected with anti-skid supporting legs. The anti-slip supporting legs make the film application device not easy to slide.

As a preferred technical solution of the application, the top of the positioning column is engaged with the positioning groove. The positioning column is inserted into the positioning groove after the top cap is covered.

As a preferred technical solution of the application, the bottom of the clamping block is clamped with the clamping seat. The clamping block is inserted in the clamping seat after the top cap is covered.

Compared with the related art, the application has the advantages that:

1. The mobile phone is clamped in the mobile phone groove at the bottom box, the toughened film and the release film are adhered below the positioning film in sequence, the film body is positioned and covered on the mobile phone screen by matching the positioning column and the hole on the positioning film, and then the top cap is covered, and the release film is drawn out from the drawing opening, so that the toughened film is adhered on the mobile phone screen, thereby the process of the film sticking on the mobile phone screen is more rapid and accurate, and with high efficiency;

2. By moving the push handle forward and backward at the surface shell to drive the lower roller to roll, it can press the toughened film attached to the screen of the mobile phone, make the sticking tighter, remove bubbles and make the process more convenient.

In that figure: 1. bottom shell; 2. surface shell; 3. push handle; 4. displacement port; 5. sliding rod; 6. roller; 7. limiting plate; 8. mobile phone groove; 9. take out groove; 10. positioning column; 11. clamping seat; 12. clamping block; 13. drawing opening; 14. anti-skid supporting leg; 15. positioning groove; 16. bottom box; 17. top cap.

DETAILED DESCRIPTION OF THE EMBODIMENTS

Hereinafter, the technical solutions in the embodiments of the present application will be clearly and completely described in conjunction with the drawings in the embodiments of the present application. Obviously, the described embodiments are only part of the embodiments of the present application, but not all the embodiments. Based on the embodiments of the present application, all other embodiments obtained by those of ordinary skill in the art without creative work shall fall within the protection scope of the present invention.

Figure 1:
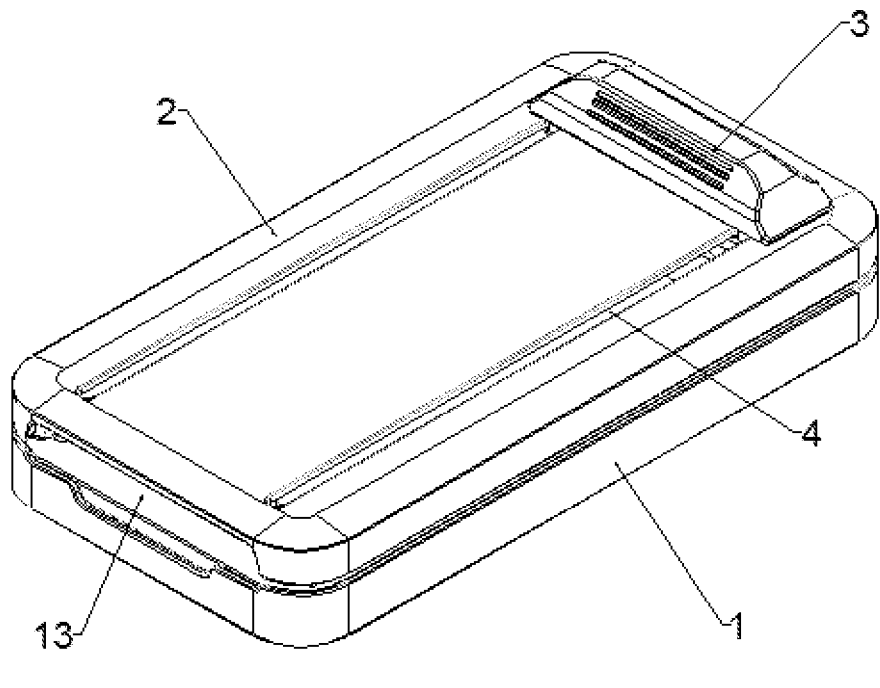
FIG. 1 is a perspective view of the application.
Figure 2:
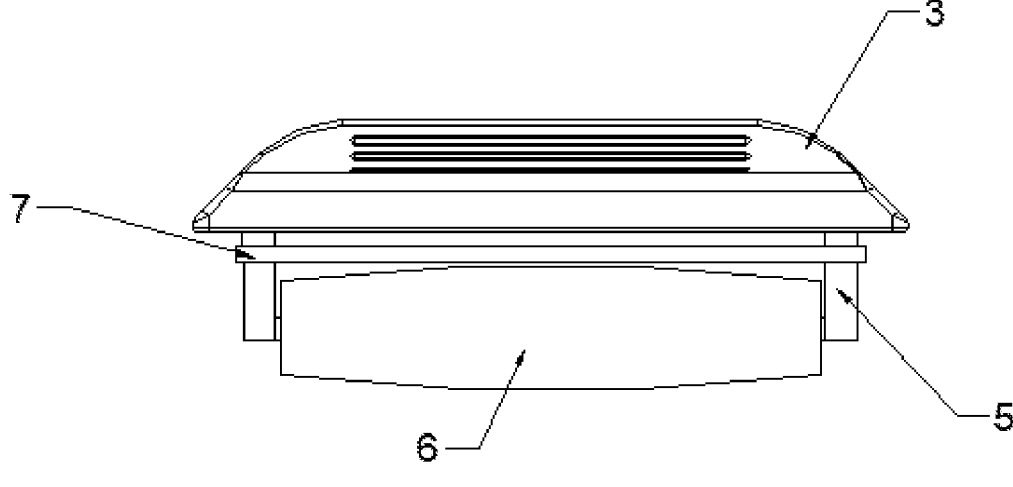
FIG. 2 is a plan view of the push handle of the application.
Figure 3:
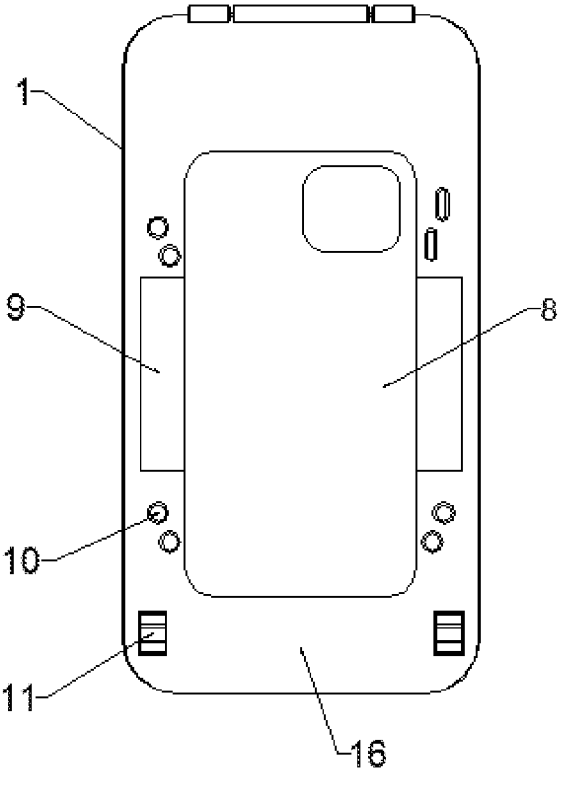
FIG. 3 is a top view of the bottom shell of the application.
Figure 4:
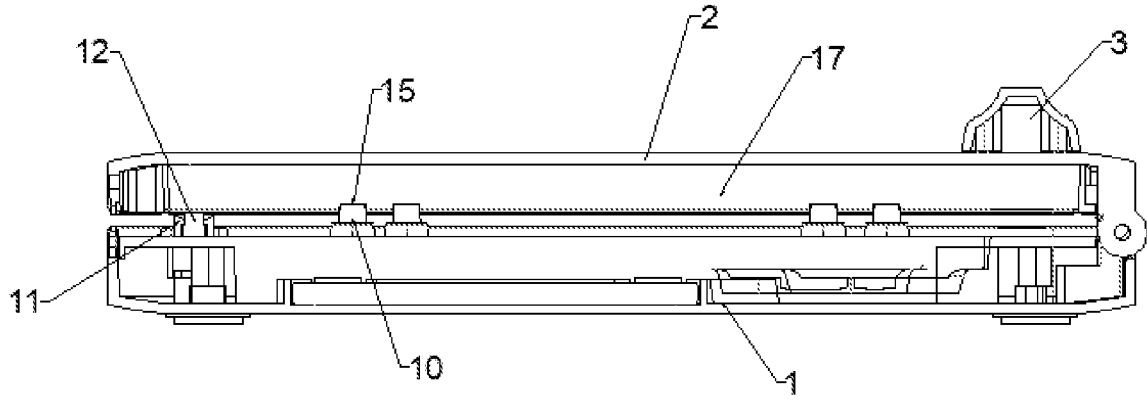
FIG. 4 is a side sectional view of the present invention.
Figure 5:
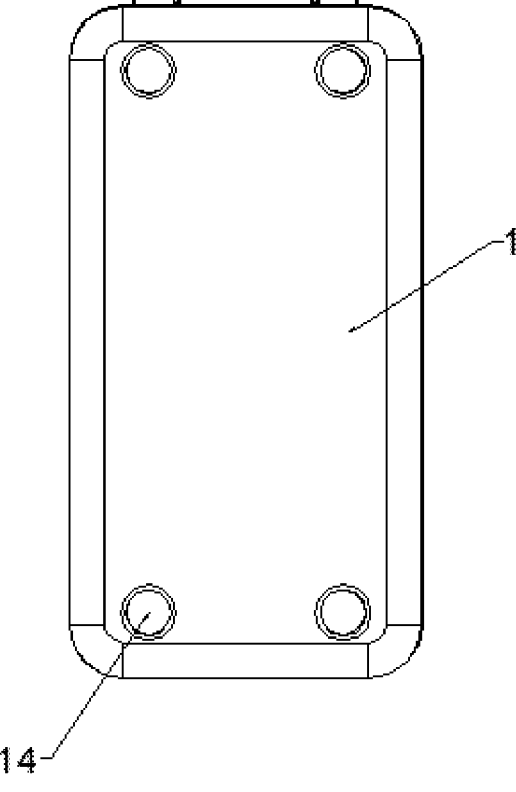
FIG. 5 is a bottom view of the present invention.

Please referring to FIGS. 1-5, the application provides an integrated film application device which comprises a bottom shell 1, a surface shell 2 hinged on the back side of the bottom shell 1; displacement ports 4 are provided on both sides of the top end of the surface shell 2; sliding rods 5 are connected to the inner walls of the two displacement ports 4 in a sliding manner; a push handle 3 is fixedly connected to the top ends of the two sliding rods 5; a roller 6 is rotatably connected to the bottom of the two sliding rods 5 to push and to press the film, and a bottom box 16 is fixedly connected to the inner wall of the bottom shell 1; the middle of the top end of the bottom box 16 is provided with a mobile phone groove 8 for clamping a mobile phone; two ends of two sides of the top end of the bottom box 16 are fixedly connected with positioning columns 10 for positioning a positioning film; two sides of one end of the top end of the bottom box 16 are fixedly connected with clamping seats 11; the inner wall of the surface shell 2 is fixedly connected with a top cap 17; two ends of two sides of the bottom end of the top cap 17 are provided with positioning grooves 15, and two sides of one end of the bottom end of the top cap 17 are fixedly connected with clamping blocks 12 for positioning.

When in use, the mobile phone is clamped in the mobile phone groove 8 at the bottom box 16, the toughened film and the release film are sequentially adhered below the positioning film, the film body is positioned and covered on the mobile phone screen by cooperating with the positioning column 10 and the holes on the positioning film, then the top cap 17 is covered, and the release film is drawn out, so that the toughened film is adhered on the mobile phone screen.

The top of the two sliding rods 5 is fixedly connected with a limiting plate 7 for positioning. Both sides of the inner wall of the mobile phone groove 8 are provided with a take out groove 9 for conveniently taking out the mobile phone, and the front side of the surface shell 2 is provided with a drawing opening 13 to be clamped with one end of the release film.

When in use, the release film can be drawn out from the drawing opening 13 after the surface shell 2 is covered, and the push handle 3 at the surface shell 2 is moved back and forth to drive the lower roller 6 to roll, so that the toughened film attached to the screen of the mobile phone can be pressed, and the sticking is tighter and bubbles are removed. The top surface of the limiting plate 7 is abutted with the surface shell 2, so that the roller 6 can be prevented from moving upwards, and finally the top cap 17 is opened and take down the positioning film, and the mobile phone is taken out by the take out groove 9.

The two ends of both sides of the bottom end of the bottom shell 1 are fixedly connected with anti-skid supporting legs 14 to improve the slip resistance. The top of the positioning column 10 is engaged with the positioning groove 15, and the bottom of the clamping block 12 is engaged with the clamping seat 11 for positioning.

When in use, the placed film fool is difficult to slide and more stable because of the setting anti-slip supporting legs 14. After the top cap 17 is covered, the positioning column 10 will be engaged with the positioning groove 15, and the clamping seat 11 will be engaged with the clamping block 12, so that the top cap 17 and the bottom box 16 will not be offset after being engaged.

Specifically, when in use, the application provides an integrated film application device. When sticking the film, the mobile phone is clamped in the mobile phone groove 8 at the bottom box 16, the toughened film and the release film are sequentially adhered below the positioning film, the film body is positioned and covered on the mobile phone screen in cooperation with the positioning column 10 and the holes on the positioning film. Then cover the top cap 17, and draw out the release film from the drawing opening 13, so that the toughened film is adhered on the mobile phone screen. Therefore, the process of the film sticking on the screen of the mobile phone is more rapid and accurate, and with high efficiency. By moving the push handle forward and backward at the surface shell 2 to drive the lower roller to roll, it can press the toughened film attached to the screen of the mobile phone, make the sticking tighter, remove bubbles and make the process more convenient, and finally, open the top cap 17 and take down the positioning film.

Although the present application has been described in detail with reference to the foregoing embodiments, those skilled in the art can still modify the technical solutions described in the foregoing embodiments, or perform equivalent replacement on some of the technical features. Any modification, equivalent replacement, improvement, etc. made within the spirit and principle of the present application shall be included in the protection scope of the present invention.

What is claimed is:

1. An integrated film application device comprising a bottom shell, wherein back side of the bottom shell is hinged with a surface shell, both sides of top end of the surface shell have displacement ports, inner walls of the two displacement ports are connected with two sliding rods in a sliding manner, top ends of the two sliding rods are fixedly connected with push handles, bottoms of the two sliding rods are rotatably connected with rollers for pressing a film onto a mobile phone, an inner wall of the bottom shell is fixedly connected with a bottom box, a middle part of a top end of the bottom box has a mobile phone groove, both ends of both sides of the top end of the bottom box are fixedly connected with positioning columns for aligning a hole of a positioning film, both sides of one end of the top end of the bottom box are fixedly connected with clamping seats, an inner wall of the surface shell is fixedly connected with a top cap, both ends of both sides of a bottom end of the top cap has positioning grooves engaged with the positioning columns, the two side of one end of the bottom end of the top cap are fixedly connected with clamping blocks that lock into the clamping seats to constrain vertical displacement.

2. The integrated film application device of claim 1, wherein tops of the two sliding rods are fixedly connected with a limiting plate.

3. The integrated film application device of claim 1, wherein two sides of an inner wall of the mobile phone groove have take out grooves.

4. The integrated film application device of claim 1, wherein a front side of the surface shell has a drawing opening.

5. The integrated film application device of claim 1, wherein two ends of a bottom end of the bottom shell are fixedly connected with anti-skid supporting legs.

6. The integrated film application device of claim 1, wherein a top of the positioning column is clamped with the positioning groove.

7. The integrated film application device of claim 1, wherein a bottom of the clamping block is clamped with the clamping seat.

* * * * *